(12) United States Patent
Clemo et al.

(10) Patent No.: US 7,741,736 B2
(45) Date of Patent: Jun. 22, 2010

(54) SYSTEM AND METHOD FOR MULTIPLE SENSE POINT VOLTAGE REGULATION

(75) Inventors: Raymond M. Clemo, Raleigh, NC (US); Jimmy G. Foster, Sr., Morrisville, NC (US); Suzanne M. Michelich, Waukesha, WI (US); Sheldon J. Sigrist, Cary, NC (US); Jacques B. Taylor, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 11/869,116

(22) Filed: Oct. 9, 2007

(65) Prior Publication Data

US 2009/0091186 A1    Apr. 9, 2009

(51) Int. Cl.
*H01H 83/00* (2006.01)

(52) U.S. Cl. .............................. 307/130; 307/31; 361/88

(58) Field of Classification Search .................. 307/31, 307/130; 361/88
See application file for complete search history.

(56) References Cited

U.S. PATENT DOCUMENTS

| | | | | |
|---|---|---|---|---|
| 5,448,155 A | | 9/1995 | Jutras | |
| 5,845,141 A | * | 12/1998 | Massie | 713/340 |
| RE36,179 E | * | 4/1999 | Shimoda | 327/407 |
| 6,031,362 A | * | 2/2000 | Bradley | 323/269 |
| 6,181,027 B1 | | 1/2001 | Grady | |
| 6,211,579 B1 | | 4/2001 | Blair | |
| 6,737,838 B2 | * | 5/2004 | Sluijs et al. | 323/225 |
| 7,000,125 B2 | | 2/2006 | Chapuis et al. | |
| 7,015,757 B2 | | 3/2006 | Li et al. | |
| 7,049,798 B2 | | 5/2006 | Chapuis et al. | |
| 2006/0139827 A1 | * | 6/2006 | Chun et al. | 361/90 |

* cited by examiner

*Primary Examiner*—Albert W Paladini
*Assistant Examiner*—Hal I Kaplan
(74) *Attorney, Agent, or Firm*—Cynthia Seal; Hoffman Warnick LLC

(57) ABSTRACT

The present invention is a system and method for sensing the voltage at multiple sense points. The present invention acquires optimal feedback from a plurality of sources including those integrated on the same motherboard, for populated or unpopulated connectors and for adapter cards plugged into the connectors, for the purpose of controlling the voltage regulator output. The voltage regulator, connected to a logic system, provides voltage to those connectors needing the voltage.

3 Claims, 6 Drawing Sheets

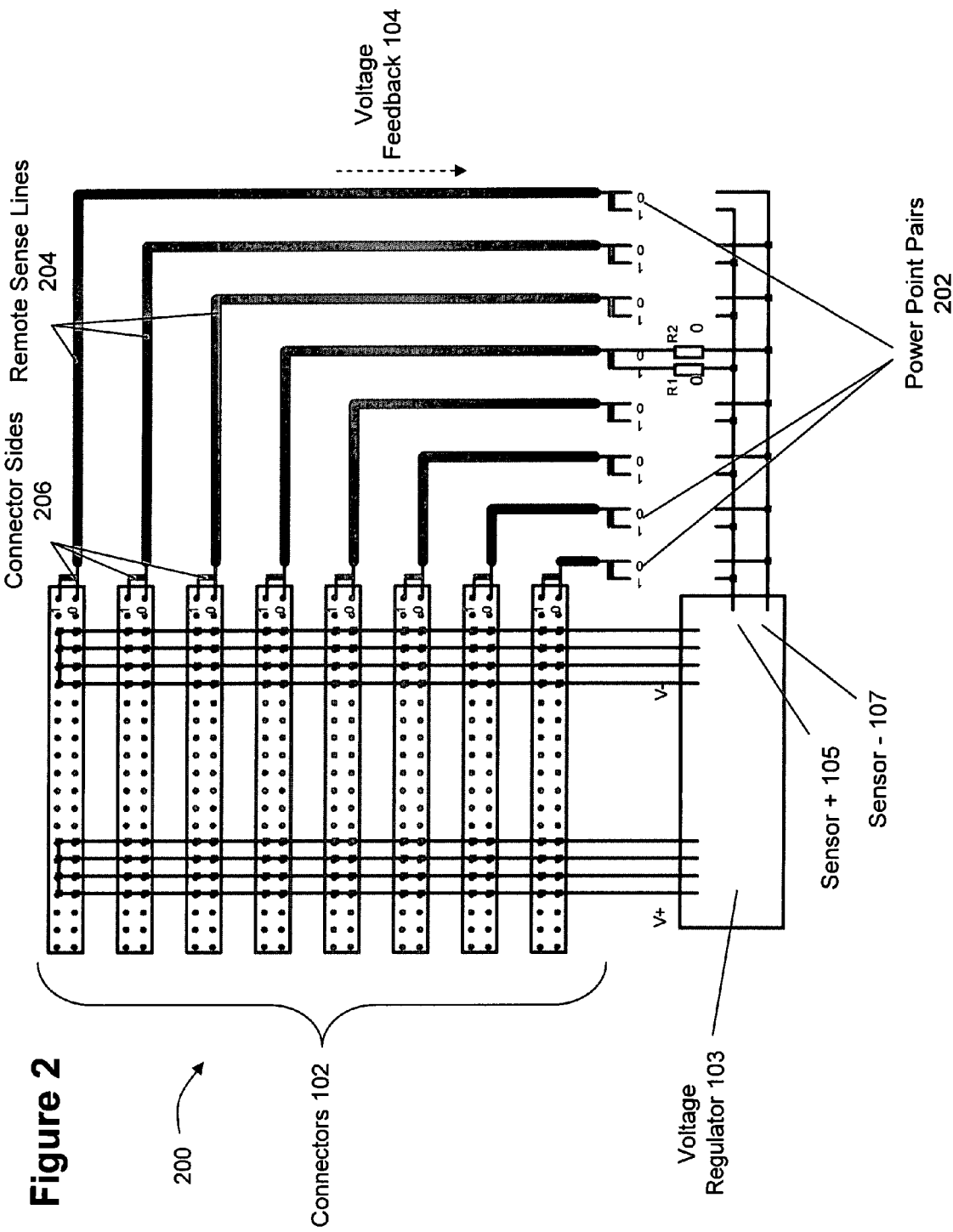

SYSTEM AND METHOD FOR MULTIPLE SENSE POINT VOLTAGE REGULATION

FIELD OF THE INVENTION

The present invention relates generally to voltage regulation and, more specifically, to improvements to systems and methods for sensing the voltage at multiple sense points.

BACKGROUND OF THE INVENTION

Large scale integration of electronic circuits continues to require lower voltages as the circuit dimensions keep dropping. Circuits that generally were designed with 5V circuits on early personal computers now are fed with circuits less than 1.5V, and the trend of lowering the voltage needs continues. As the frequency of operation continues to rise and circuit density increases, power needs have risen from a few watts per device to more than 100 watts for many devices. As voltage drops and power needs increase, current must go up. Future memory currents of 100A or more will not be uncommon in servers.

When voltages were at 5V, the noise margin was typically 0.8V to ground or above 2V to power. Current voltage levels are now less than noise levels used to be, hence a requirement for better accuracy in delivery power.

Newer chip and adapter technology, including new memory technology, have more voltages, lower voltages, higher currents and more loads than previously but do not provide an improved power delivery mechanism to compensate. For example, current art senses the voltage on the power plane of the motherboard in the area of memory connectors for feedback control and does not accurately reflect the losses through the memory connectors or on the memory card or the ability to account for dynamic configuration changes.

There presently is a need for a system and method for sensing the voltage at multiple sense points.

BRIEF SUMMARY OF THE INVENTION

The present invention is a system and method for sensing the voltage at multiple sense points. The system and method of the present invention acquires optimal feedback from a plurality of sources including those integrated on the same motherboard, for populated or unpopulated connectors and for adapter cards plugged into the connectors, for the purpose of controlling the voltage regulator output. In another embodiment, the system and method of the present invention continuously monitors voltage feedback from sense point pairs and determines, using logic, an optimal voltage for regulation and provides that optimal voltage to the voltage regulator.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 2 illustrates an embodiment of the present invention with remote sensors (sense pairs) at each connector for sensing voltage at each connector, selecting the sense pair closest to violation, and hard wiring the selected sense pair to a voltage regulator.

The drawings are intended to depict only typical aspects of the invention, and therefore should not be considered as limiting the scope of the invention. In the drawings, like numbering represent like elements between the drawings.

DETAILED DESCRIPTION OF THE INVENTION

The present invention provides a system and method for sensing the voltage at multiple sense points.

Figure 1A:
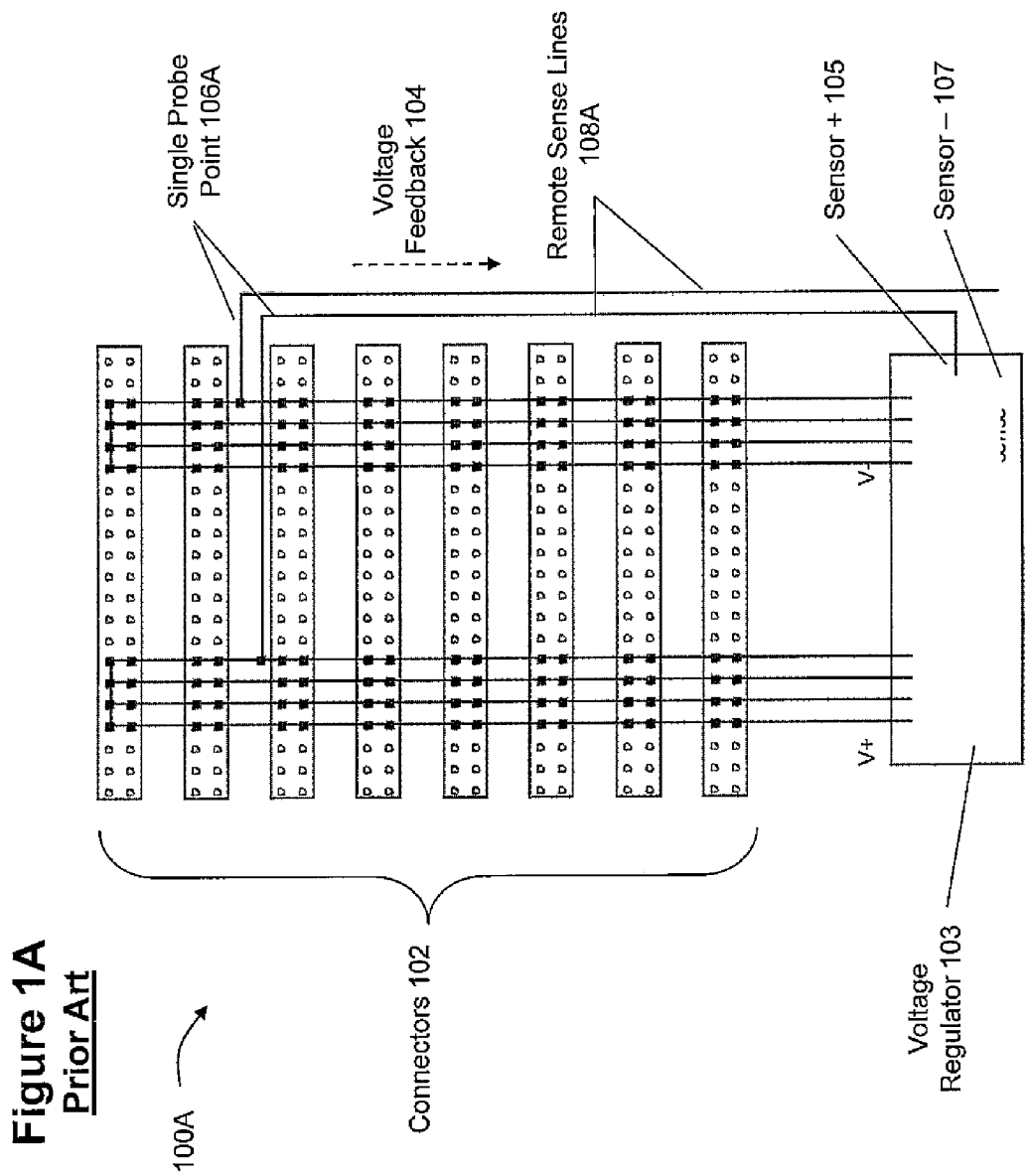
FIG. 1A is a diagram which illustrates a basic system with probes at the power plane.

FIG. 1A shows a prior art System 100A on a motherboard for sensing Voltage Feedback 104 near Connectors 102 utilizing Voltage Regulator 103. A motherboard is the central or primary circuit board making up a complex electronic system, such as a modern computer. It could also be on a PDA or even a cell phone. It is also known as a mainboard, baseboard, system board, or, on Apple computers, a logic board. The basic purpose of the motherboard is to provide the electrical and logical connections by which the other components of the system communicate. A voltage regulator is an electrical regulator designed to automatically maintain a constant voltage level. Voltage Regulator 103 accepts the positive and negative returns of Voltage Feedback 104 at Sensor+ 105, Sensor− 107 through Remote Sense Lines 108A. Single Probe Points 106A are taken from regions on the motherboard thought by previous engineers to give the best results but this is problematic as the Connectors 102 generally can be populated with adapters or other electronic devices. Also, Connectors 102 can have varying amounts of load and voltage drop because the adapters or other electronic devices can be built from different manufacturers with different power characteristics due to component type and quantity. For example, it is common in the industry for adapters or other electronic devices that can plug into the same connector to have cards which could be populated with any number of memory devices, plus a few extra components—all of which consume power. This causes the various power requirements. The Voltage Regulator 103 has a difficult time determining the power needs of the Connectors 102 and providing the power needs to the Connectors 102.

Most systems of the prior art, have predetermined sense points without knowing ahead of time which connectors will be populated nor for those that will be populated with how much load. The electrical current (more information on electrical currents can be found at http://amasci.com/amateur/elecdir.html) passing through the remote sense lines is only a micro-Amp or so, yielding a negligible voltage drop. Voltage sensing on the adapter side of the connector will be much more accurate than the art of FIG. 1A.

Figure 1B:
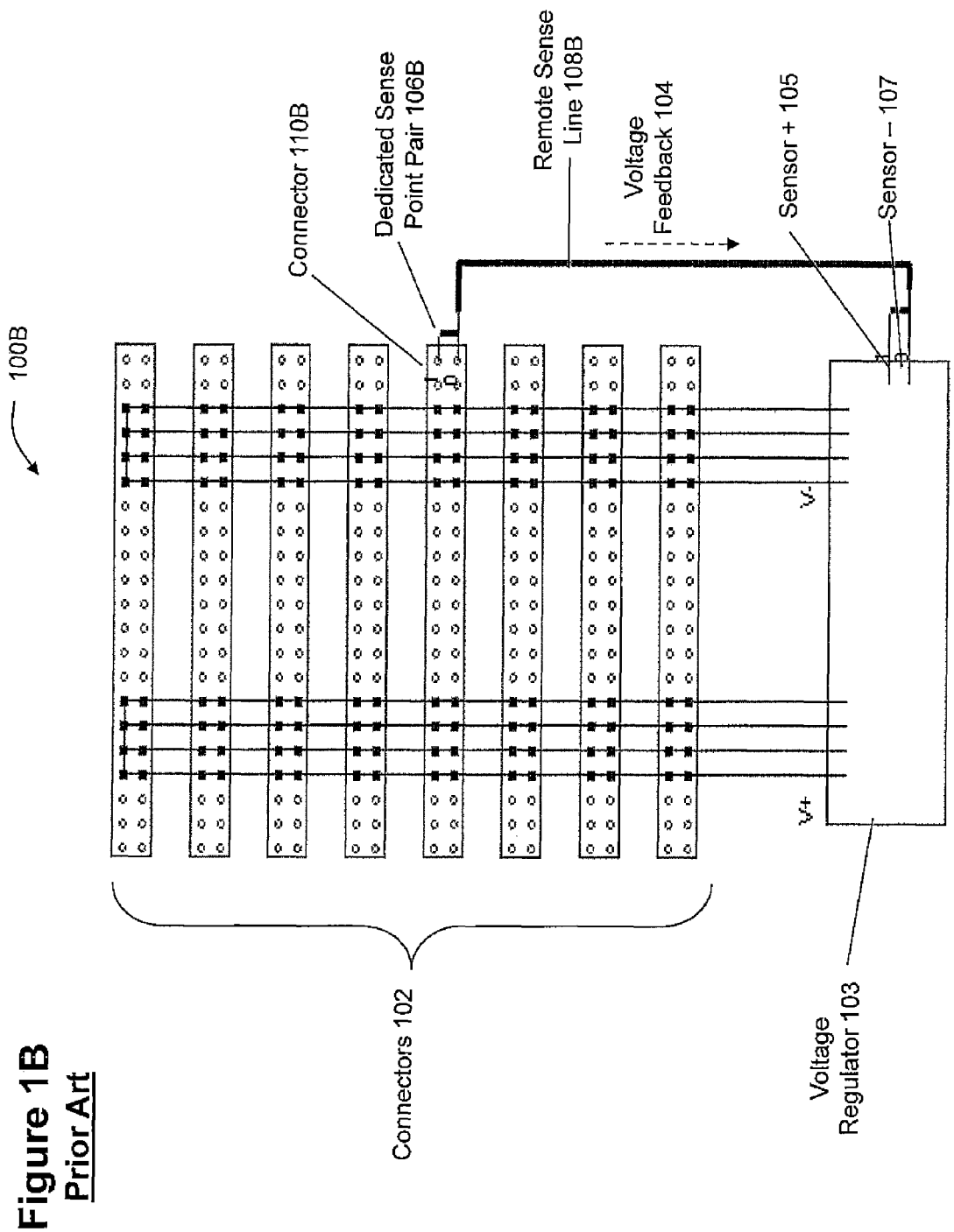
FIG. 1B is a diagram which illustrates a basic system with a dedicated sense point pair on a single connector at the power plane.

FIG. 1B shows prior art System 100B with an improvement over System 100A where a Dedicated Sense Pin Pair 106B on a Connector 110B can return the voltage read at a point on the adapter immediately at the side of the connector. This way, the voltage drop across the connector power pins can be taken into account. For adapter cards with heavy loads the voltage drop across the connector can be significant. However, the current passing through the remote sense lines 108B is only a micro-Amp or so, yielding a negligible voltage drop. Voltage sensing on the adapter side of the connector will be much more accurate than the art of FIG. 1A.

Not shown in FIG. 1B is an improved method over prior art where the sense signals are not connected to dedicated pins for this purpose but the motherboard wiring is changed to recover two power pins and convert them to sense lines for feedback control. In cases where sufficient power delivery pins allow this and where probing accuracy is the greater concern because of tight tolerances this invention is applicable.

A further improvement can be made by allowing the adaptor vendor to place remote remote sensors at a strategic point on the card, closer to the load. Even though many types of adapters may be plugged into a connector, each different adapter generally has a known static signature and the best place to locate the sensor is known and is accommodated.

FIG. 2 shows a System 200 of the present invention which is an improvement from the prior art where a dedicated sense Power Point Pair 202 on each Connector 102 utilizing Remote Sense Lines 204 can return the Voltage via Voltage Return 104 at a point immediately at the Sides 206 of each of the Connectors 102. This way, the voltage drop across the Power Point Pair 202 can be taken into account. For adapter cards, with heavy loads, the voltage drop across the connector can be significant.

FIG. 2 further shows the System 200 of the present invention for sensing voltage utilizing Power Point Pairs 202 connected to the Connector Sides 206 of each of Connectors 102 and feeding the voltage readings to the Voltage Regulator 103. A new system may be tested by inserting various adapters into the Connector Sides 206 to determine which sense point (using Remote Sense Lines 204, Power Point Pairs 202 and Voltage Regulator 103) returns the highest voltage and which returns the lowest voltage and select the one closest to violation of a policy. It is determined which of the Connectors 102 has a high or low voltage requirement. The chosen remote sense pair of the Power Point Pairs 202 is then physically connected as input for the Voltage Regulator 103 to regulate with. There can be a load test against System 300 to select the optimal feedback that need only occur once in the life of the system. Load testing is the process of creating demand on a system or device and measuring its response.

Figure 3:
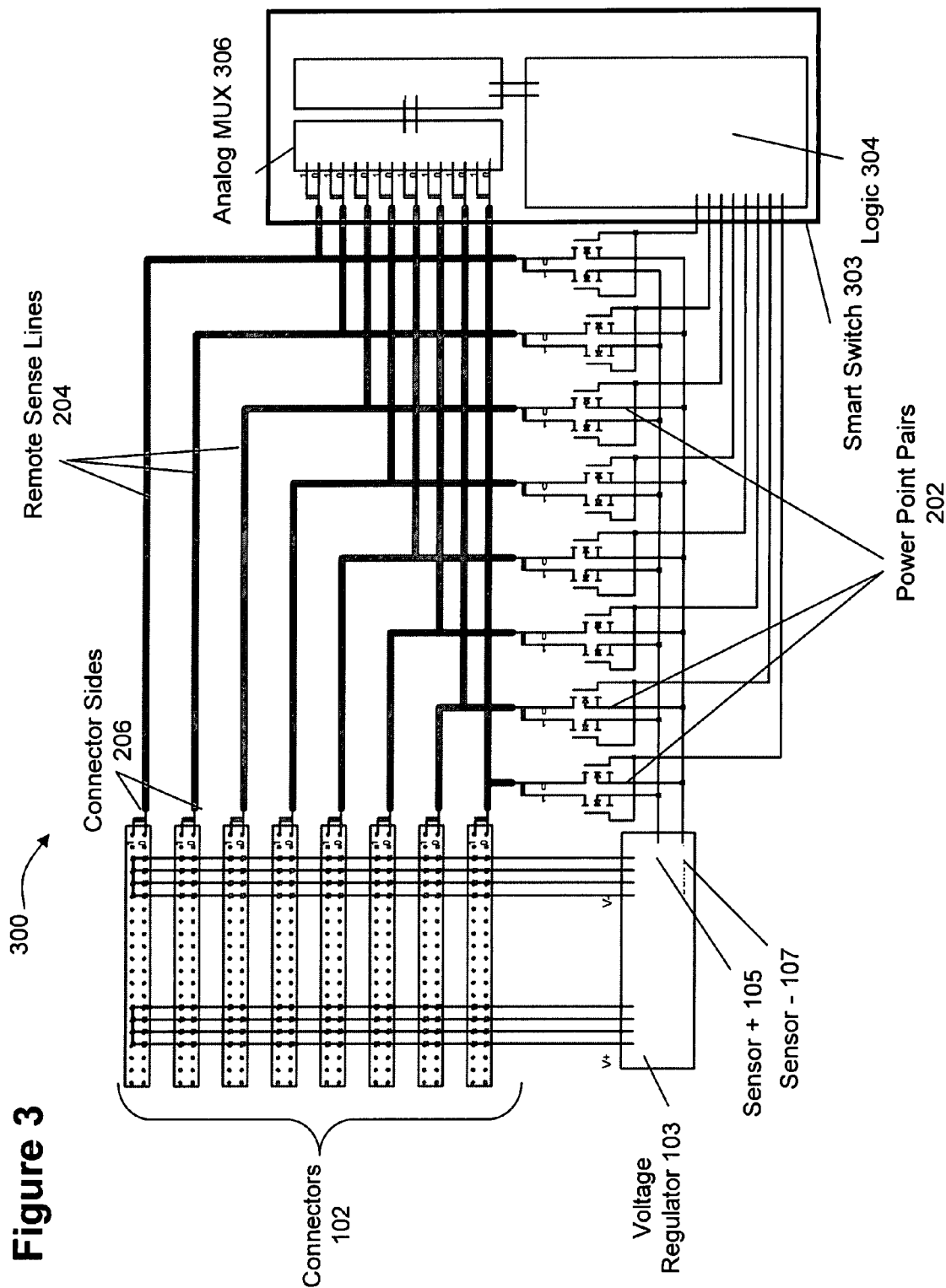
FIG. 3 illustrates the system of the present invention where the sense pairs are connected to a smart switch and the smart switch determines which sense pair is optimum for regulation and provides a single feedback to the voltage regulator for regulation.

FIG. 3 shows another embodiment 300 where a single feedback is provided to the Regulator 103 by way of a Smart Switch 303 comprising Analog MUX 306 and Logic 304. The Smart Switch 303 monitors the various remote sense points (Remote Sense Lines 204) from the Connectors 102 as sensed at Connector Sides 206 and determines which pair is optimum for voltage regulation. The Smart Switch 303 then closes contact between the chosen sense point and Regulator 103 so it can regulate to that point. The Smart Switch 303 can monitor the various remote sense points every time the system is brought up, or, whenever there is a change in the number or location or type of adapter, and choose the appropriate remote sense pair. The advantage over the embodiment in FIG. 2 is that there is no need to choose an optimal sense pair at first build. Rather, the system is now empowered to choose the correct sense pair.

Figure 4:
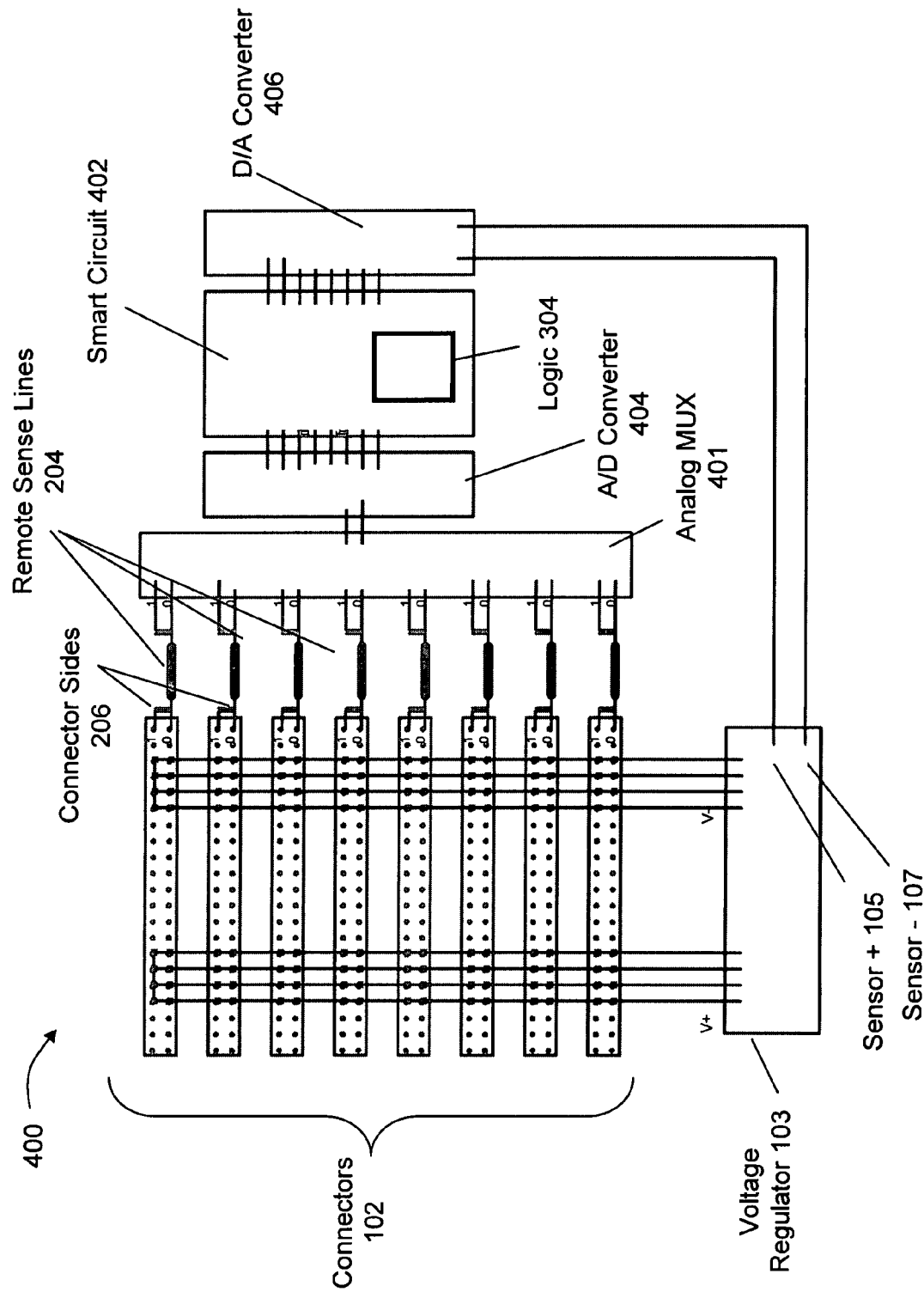
FIG. 4 illustrates the system of the present invention for continuously sensing from multiple connectors having a smart circuit for determining, using a logic system, an optimum voltage for regulation and providing the optimum voltage to the regulator.

FIG. 4 also shows the system of the present invention 400 where a single feedback is provided to the Regulator 103 by way of a Smart Circuit 402. Smart Circuit 402, along with Logic 304, continuously monitors the various remote sense points from the Connectors 102 at Connector Sides 206 along the Remote Sense Lines 204 and, through algorithms stored in Logic 304, or other logic, feeds the data for optimal voltage to the Voltage Regulator 103 so that it can feed the proper regulated voltage to that particular feed point. The sensed voltages are passed to an Analog MUX 401 which switches, one by one, the sensed voltage from each of the Connectors 102 to A/D Converter 404 which converts the sensed voltage to digital form and passes the digital form to the Smart Circuit 402. The Smart Circuit 402 continuously monitors the voltage so that it can dynamically determine an optimum voltage to be regulated by Regulator 103 using Logic 304. Once determined, Smart Circuit 402 passes the optimum voltage to D/A Converter 406 which passes the optimum voltage to Regulator 103.

Figure 5:
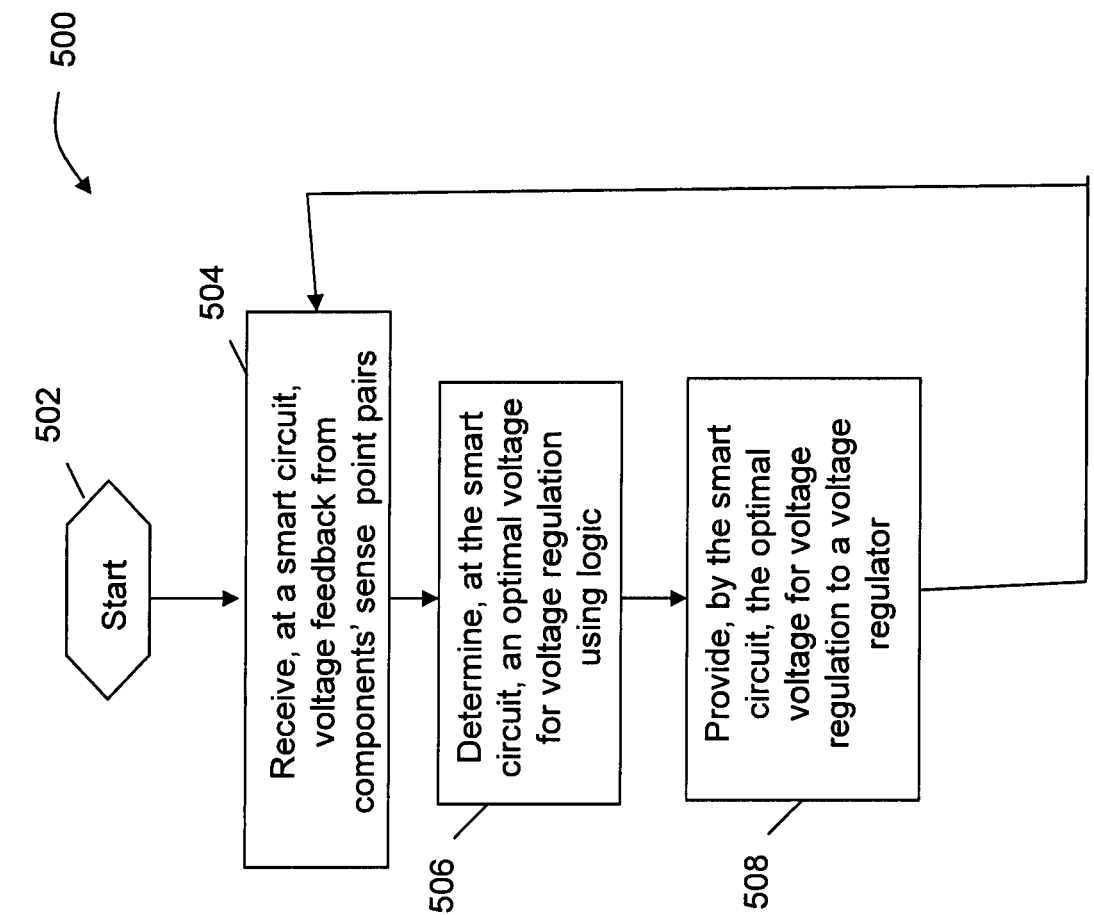
FIG. 5 illustrates the improved method of the present invention for sensing, by the smart circuit, from multiple connectors and, by the smart circuit, using a logic system to return an optimum voltage to the regulator.

FIG. 5 illustrates the improved Method 500 of the present invention where the sense signals are connected to dedicated pins for the purpose of the present invention. However, the motherboard wiring is changed to recover two power pins and convert them to sense lines for feedback control. In cases where sufficient power delivery pins allow this and where probing accuracy is the greater concern because of tight tolerances this invention is applicable. The Method 500 starts at Step 502 and continues to Step 504 where, at a smart circuit, voltage feedback from components' sense point pairs is received. At Step 506, at the smart circuit, an optimal voltage for voltage regulation using logic is determined. At Step 508, by the smart circuit, the optimal voltage for voltage regulation is provided to a voltage regulator. Because the voltage feedback from the components' sense point pairs is continuously monitored, the Method 500 returns to Step 504 where, at a smart circuit, voltage feedback from components' sense point pairs is received and the Method 500 continues as described above.

A further part of this invention is allowing the adaptor vendor to place remote sense at a strategic point on the card, closer to the load. Even though many types of adapters may be plugged into this connector, each different adapter generally has a known static signature and the best place to locate the sensor is known and is accommodated.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for sensing the voltage at multiple sense points comprising:
   one or more connectors for receiving adapters or other electronic components;
   sensors, connected to each of the connectors, for sensing the voltage used and needed by the connectors;
   a multiplexer (MUX) for receiving voltage readings from the sensors and for multiplexing those readings and passing those readings to a logic system;
   the logic system determining a highest voltage and a lowest voltage of the voltage readings and for selecting which of the highest voltage and the lowest voltage readings is closest to a voltage requirement; and
   a voltage regulator, connected to the logic system, for receiving the closest voltage reading.

2. The system of claim 1, wherein each sensor comprises a dedicated sense power point pair.

3. The system of claim 1, wherein the MUX receives voltage readings from the sensors via remote sense lines.

* * * * *